United States Patent
Ji et al.

(10) Patent No.: US 10,311,061 B2
(45) Date of Patent: Jun. 4, 2019

(54) QUALITY-DRIVEN PROCESSING OF OUT-OF-ORDER DATA STREAMS

(71) Applicant: SAP SE, Walldorf (DE)

(72) Inventors: Yuanzhen Ji, Dresden (DE); Zbigniew Jerzak, Berlin (DE); Anisoara Nica, Waterloo (CA); Gregor Hackenbroich, Dresden (DE)

(73) Assignee: SAP SE, Walldorf (DE)

( * ) Notice: Subject to any disclaimer, the term of this patent is extended or adjusted under 35 U.S.C. 154(b) by 622 days.

(21) Appl. No.: 14/935,009

(22) Filed: Nov. 6, 2015

(65) Prior Publication Data

US 2017/0132285 A1     May 11, 2017

(51) Int. Cl.
    *G06F 17/30*     (2006.01)
    *G06F 7/00*     (2006.01)
    *G06F 16/2455*     (2019.01)

(52) U.S. Cl.
    CPC ............... *G06F 16/24568* (2019.01)

(58) Field of Classification Search
    CPC ............ G06F 17/30474; G06F 17/30516
    USPC ................................................. 707/713
    See application file for complete search history.

(56) References Cited

U.S. PATENT DOCUMENTS

| | | | |
|---|---|---|---|
| 6,370,520 B1 * | 4/2002 | Ruutu | H04L 47/10 |
| | | | 707/999.001 |
| 6,438,101 B1 * | 8/2002 | Kalampoukas | H04L 47/10 |
| | | | 370/229 |
| 7,587,570 B2 * | 9/2009 | Sarkar | G06F 3/0605 |
| | | | 711/170 |
| 7,616,642 B2 | 11/2009 | Anke et al. | |
| 7,616,960 B2 | 11/2009 | Anke et al. | |
| 7,661,032 B2 * | 2/2010 | Eberbach | G06F 11/008 |
| | | | 707/686 |
| 7,676,522 B2 | 3/2010 | Klein et al. | |
| 7,676,523 B2 | 3/2010 | Klein et al. | |

(Continued)

OTHER PUBLICATIONS

Ji, Yuanzhen et al. "Quality-Driven Processing of Sliding Window Aggregates over Out-of-Order Data Streams," Pub. *DEBS*' Jun. 29, 2015, Oslo, Norway, 12 pages.

(Continued)

*Primary Examiner* — Pavan Mamillapalli
(74) *Attorney, Agent, or Firm* — Fish & Richardson P.C.

(57) ABSTRACT

The present disclosure involves systems, software, and computer implemented methods for providing quality-driven processing of out-of-order data streams based on a configurable quality metric. In one example, the method includes identifying a configurable quality metric defined by a user or application for executing continuous queries over a sliding window, the metric specifying a user requirement for the quality of the continuous query result. A quality threshold metric is calculated based on the configurable quality metric, the configurable quality metric associated with a size of an adaptation buffer for incoming tuples of the query. In response to receiving a signal indicating a new query result, a sliding window prior to a current time is identified. A runtime quality metric associated with the incoming tuples for the sliding window is measured, and the adaptation buffer is modified based on a difference between the quality threshold metric and the measured runtime quality metric.

20 Claims, 7 Drawing Sheets

(56) References Cited

U.S. PATENT DOCUMENTS

| | | | |
|---|---|---|---|
| 8,274,996 B1* | 9/2012 | Yuan | H04L 1/1614 |
| | | | 370/473 |
| 8,346,819 B2 | 1/2013 | Do et al. | |
| 8,406,919 B1* | 3/2013 | Hill | G05B 19/41875 |
| | | | 399/42 |
| 8,848,532 B2* | 9/2014 | Zhi | G06F 15/17325 |
| | | | 370/235 |
| 9,002,822 B2 | 4/2015 | Jerzak et al. | |
| 9,002,823 B2 | 4/2015 | Jerzak et al. | |
| 9,007,208 B2 | 4/2015 | Jerzak et al. | |
| 9,465,846 B2* | 10/2016 | Chen | G06F 16/24568 |
| 9,678,811 B2* | 6/2017 | Mutschler | G06F 9/542 |
| 9,886,521 B2* | 2/2018 | Wu | G06F 16/9024 |
| 10,136,165 B2* | 11/2018 | Karlsson | H04N 21/2181 |
| 2003/0236904 A1* | 12/2003 | Walpole | H04L 12/1881 |
| | | | 709/231 |
| 2004/0199368 A1* | 10/2004 | Bechhoefer | G01H 1/003 |
| | | | 703/7 |
| 2008/0168308 A1* | 7/2008 | Eberbach | G06F 11/008 |
| | | | 714/26 |
| 2015/0363245 A1* | 12/2015 | Mutschler | G06F 9/542 |
| | | | 719/318 |

OTHER PUBLICATIONS

Ji, Yuanzhen et al. "Quality-Driven Continuous Query Execution over Out-of-Order Data Streams," Pub. *SIGMOD*' May 31, 2015,, Melbourne, Victors, Australia; 6 pages.

Slide Presentation entitled "*Quality-Driven Processing of Sliding Window Aggregates over Out-of-Order Data Streams*," DEBS 2015—Jul. 1, 2015, Oslo, Norway, 12 pages.

* cited by examiner

QUALITY-DRIVEN PROCESSING OF OUT-OF-ORDER DATA STREAMS

TECHNICAL FIELD

The present disclosure relates to computer systems and computer-implemented methods for providing quality-driven processing of out-of-order data streams based on a configurable quality metric.

Data stream processing is the technology of processing high-velocity data streams in the form of potentially unbounded sequences of tuples with low latency. Data streams arise in a variety of domains including sensor networks, network monitoring, and financial markets, among others. Data streams are processed using continuous queries, which return results continuously as new tuples arrive.

A relational data stream management system (RDSMS) is an in-memory data stream management system (DSMS) that is designed to use structured query language (SQL) and operator-based queries to process unstructured and structured data streams in real-time. Unlike SQL queries executed in a traditional relational database management system (RDBMS), which return a result and exit, queries executed in a RDSMS do not exit, generating results continuously as new data becomes available. Continuous queries in a RDSMS can use the Window function to analyze, join, and aggregate data streams over fixed or sliding windows. Windows can be specified as time-based or row-based.

SUMMARY

The present disclosure involves systems, software, and computer implemented methods for providing quality-driven processing of out-of-order data streams based on a configurable quality metric. In one example, the method includes identifying a configurable quality metric defined by a user or application for executing continuous queries over a sliding window, the metric specifying a user requirement for the quality of the continuous query result. A quality threshold metric is calculated based on the configurable quality metric, the configurable quality metric associated with a size of an adaptation buffer for incoming tuples of the query. In response to receiving a signal indicating a new query result, a sliding window prior to a current time is identified. A runtime quality metric associated with the incoming tuples for the sliding window is measured, and the adaptation buffer is modified based on a difference between the quality threshold metric and the measured runtime quality metric.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1A:
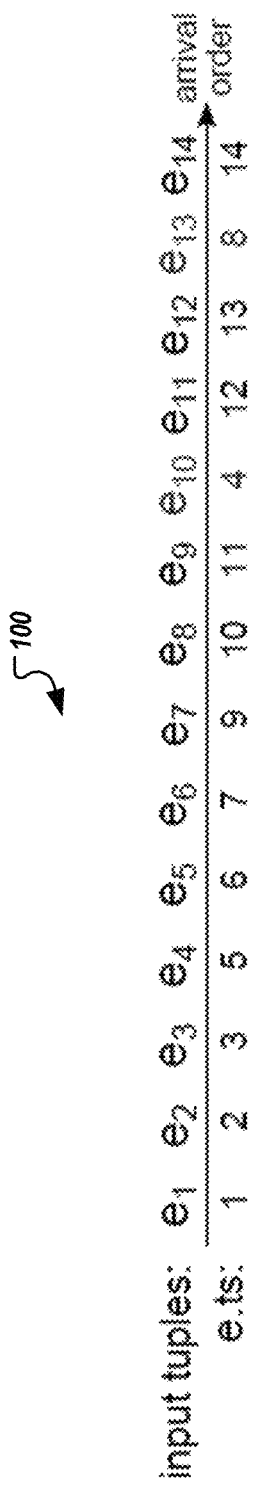
FIGS. 1A-1B illustrate an example out-of-order tuple stream.

The present disclosure describes example systems and methods for improving processing of out-of-order data streams based on a user- or application-defined quality goal. One fundamental challenge in data stream processing is to cope with the ubiquity of disorder of tuples within a stream caused by network latency, operator parallelization, merging of asynchronous streams, and other reasons. High result accuracy and low result latency are two conflicting goals in out-of-order stream processing. Different applications may prefer different extents of trade-offs between the two goals. However, existing disorder handling solutions either try to meet one goal to the extreme by sacrificing the other, or try to meet both goals but have shortcomings including unguaranteed result accuracy or increased complexity in operator implementation and application logic.

To meet different application requirements on the latency versus result accuracy trade-off in out-of-order stream processing, tools for making this trade-off configurable are made available. Particularly, focusing as an example on sliding window aggregates, AQ-K-slack, a buffer-based quality-driven disorder handling approach is described. AQ-K-slack can adjust the input buffer size dynamically to minimize the result latency, while respecting user-specified threshold on relative errors in produced query results. AQ-K-slack requires no a priori knowledge of disorder characteristics of data streams and imposes no changes to the query operator implementation or the application logic. Experiments over real-world out-of-order data streams show that, compared to prior solutions, AQ-K-slack can reduce the average buffer size, and thus the average result latency, by at least 51% while respecting user-specified requirements on the accuracy of query results.

Data stream processing is the technology of processing high-velocity data streams in the form of potentially unbounded sequences of tuples with low latency. Data streams naturally arise in a wide variety of domains including sensor networks, network monitoring, and financial markets. Data streams are processed using continuous queries, which return results continuously as new tuples arrive. Sliding window aggregate queries are at the heart of many continuous analytics applications, and are also the focus of this description. However, other operators in addition to the sliding window aggregate operators may be used and optimized with similar techniques, and the operator examples described herein are not meant to be limiting, as one of skill in the art would understand.

A sliding window aggregate query continuously constructs time-based (e.g., 5 seconds) or count-based (e.g., 10 tuples) windows over the data stream, and evaluates a certain aggregate function (e.g., SUM, AVG, QUANTILE) on each window. The size of each window is specified by a parameter w, and the distance between the endpoints of two consecutive windows, which is called the window slide, is specified by a parameter $\beta$.

Stream tuples are often tagged with timestamps as they are generated, which naturally define a temporal order among all tuples in a stream. An important challenge in data stream processing is to cope with out-of-order streams, where tuples are not ordered according to their timestamps. FIG. 1 illustrates an out-of-order stream 100. A stream tuple is denoted as $e_i$, where i represents the arrival order of the tuple. The timestamp of a tuple e is denoted by e.ts. The tuples $e_{10}$ and $e_{13}$ in this stream are called late arrivals, because they arrive after some tuples which have larger timestamps. Specifically, a tuple $e_j$ is called a late arrival if there is at least one tuple $e_i$ such that $i<j$ and $e_i.ts > e_j.ts$.

Out-of-order streams potentially occur in many scenarios. One typical scenario is the distributed computing environment. For example, a stream observed by the "sink" node in a sensor network is practically a composite stream consisting of interleaved tuples from multiple sensors. Because of the inherent asynchrony within the network, tuples from different sensors may experience different delays and arrive at the sink node in an arbitrary order. Even tuples from a single sensor can be out of order if an unreliable transmission protocol is used. Another representative scenario is operator parallelization, where data are partitioned and processed by several parallel instances of a query operator. Results from parallel operator instances may arrive out of order at the merger because of different processing speeds of those instances. Moreover, some query operators, such as join and union, may produce out-of-order data streams themselves.

Dealing with disorder within data streams is a requirement for stream processing systems. The existence of late arrivals makes it difficult to determine when a window has received all tuples falling into the window scope. On the one hand, result latency can be minimized by optimistically assuming the absence of late arrivals and producing the query result for a window as soon as the tuple whose timestamp indicates the close of the window scope arrives. However, this may lead to inaccurate query results. On the other hand, the result accuracy can be improved by conservatively delaying the result computation to wait for late arrivals, however, this increases the result latency.

An example based on the stream 100 of FIG. 1 is provided here. Assume that a sliding window COUNT(*) query is executed against the out-of-order stream 100 in FIG. 1, and the window size is 10 time units. At the arrival of $e_8$, whose timestamp is 10, the window with scope [1; 10] is closed. Assuming no future late arrivals, we can compute the COUNT(*) result of this window as 8 immediately, based on already received tuples. However, this result is inaccurate; because late arrivals $e_{10}$ and $e_{13}$, whose timestamps fall into the scope [1; 10] as well, are not counted. If we delay the result computation by 2 time units, we would receive the late arrival $e_{10}$ and produce a more accurate result 9. Delaying the result computation by 4 time units, we would receive the late arrival en as well, and obtain the exact result 10.

The above discussion suggests that a high result accuracy and a low result latency are two conflicting goals in out-of-order stream processing. A variety of disorder handling approaches have previously been proposed: using buffers to re-order, using punctuations to indicate that no more late arrivals to a window are expected, or producing results speculatively with or without applying a compensation technique to correct early emitted inaccurate query results when late arrivals are observed. These approaches either trade the result latency to maximize the result accuracy or trade the result accuracy to minimize the result latency. Some approaches try to balance the two goals, but they have short-comings including unguaranteed result accuracy or increased complexity in the operator implementation and the application logic. The present solution acknowledges that both the latency and the quality (i.e., the accuracy) of query results are important for stream applications, and that different applications may require different trade-offs between these two metrics. Therefore, the tools and systems described herein allow the latency versus result accuracy trade-off to be user- or application-configurable. Particularly, a solution is described to minimize the result latency by adjusting the time of waiting for late arrivals in a quality-driven manner.

In the present description, the problem of executing sliding window aggregate queries over out-of-order data streams is addressed. However, additional and alternatively queries may also use similar methods. In the described solution, out-of-order tuples cannot be indefinitely late, but the solution has no a priori knowledge of the disorder pattern within the stream. The goal is to dynamically adjust the waiting time for late arrivals at query runtime to minimize the result latency, while honoring the user- or application-specified threshold for relative errors in produced aggregate results. Â denotes a produced query result, and A the corresponding exact query result. The relative error $\varepsilon$ of the produced result is defined as $$\varepsilon = \frac{|A - \hat{A}|}{|A|}.$$

The user-specified threshold is of the form $(\varepsilon_{thr}, \delta)$, stating that the relative error in the query result exceeds $\varepsilon_{thr}$, with probability of at most $\delta$.

The solution described herein provides the following advantages and ideas. The specification describes quality-driven disorder handling in the presence of user-specified thresholds for relative errors in produced query results. AQ-K-slack—a buffer-based disorder handling solution which can dynamically adjust the buffer size at query runtime to minimize the result latency, while respecting the user- or application-specified threshold—is presented. Window coverage, denoted by $\theta$, is used as an intermediate metric for measuring the quality of query results. The concept of window coverage leverages the similarity between disorder handling and sampling-based approximate query processing. A window coverage threshold, denoted by $\theta_{thr}$, is derived from a user- or application-specified error threshold. The buffer size is adjusted based on deviations between measured window coverages of produced query results and the derived threshold using a proportional-derivative (PD) controller. To obtain window coverages, the solution learns the distribution of the delay of late arrivals from the stream history, and uses a most recent result, whose window coverage is estimated to be accurate enough, to drive the buffer size adaptation.

The key idea of buffer-based disorder handling is to use a buffer to sort tuples from the input stream in ascending timestamp order before presenting them to the query operator (e.g., the sliding window aggregate operator). Buffering and sorting delay the processing of input tuples by the query operator, thus adding latency to query results. The mechanism used by AQ-K-slack for managing the buffer size extends the mechanism used by the K-slack approach, denoted as MP-K-slack hereafter.

In MP-K-slack, the buffer size is K time units. The parameter K is initialized to zero. A variable $t_{curr}$ is used to track the greatest timestamp of tuples seen so far in the stream history. At query runtime, newly arrived tuples are first inserted into the buffer, and their timestamps are compared with the current $t_{curr}$. Each time when $t_{curr}$ is updated, two actions are performed. First, K is updated to max {K, $D(e_i)$}, where $D(e_i)=t_{curr}-e_i.ts$ denotes the delay of the tuple $e_i$. $D(e_i)$ is evaluated for each tuple $e_i$ that has arrived since the last update of $t_{curr}$. Second, any tuple $e_i$ satisfying $e_i.ts+K \leq t_{curr}$ from the buffer.

Figure 1B:
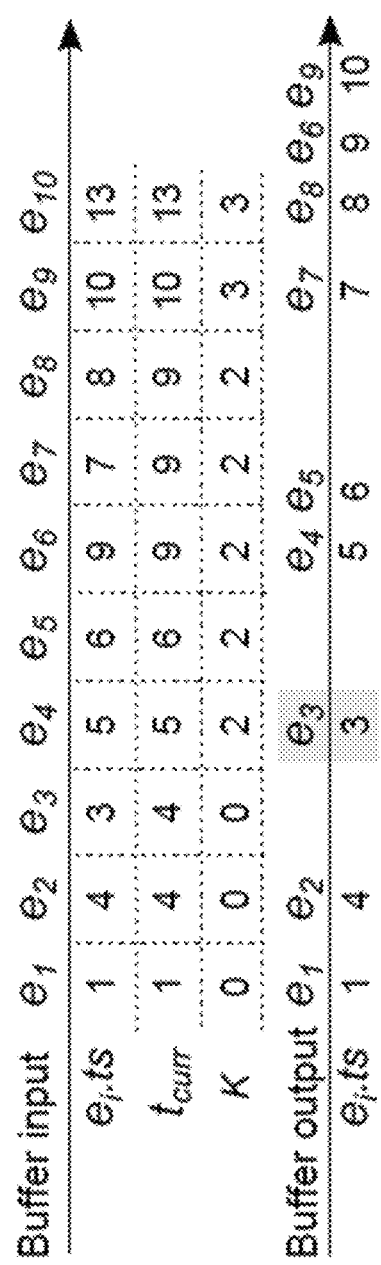

The example in FIG. 1B illustrates how MP-K-slack works. In the beginning, K is zero. Tuple $e_1$ (with timestamp 1) and tuple $e_2$ (with timestamp 4) update $t_{curr}$, and are emitted from the buffer immediately. Tuple $e_3$ (with timestamp 3) is a late arrival as it is out-of-order in the stream, and therefore cannot update $t_{curr}$. The delay $D(e_3)$ of $e_3$ is deduced as 5-3=2, when $t_{curr}$ is updated to 5 by the receipt of $e_4$ (with timestamp 5). Because $D(e_3)$ is bigger than the current K (which is zero), K is updated to $D(e_3)=2$. After K is updated, $e_3$ is emitted from the buffer since it satisfies $e_i.ts+K \leq t_{curr}$. Tuples $e_4$ (with timestamp 5) and $e_5$ (with timestamp 6) are kept in the buffer until $e_6$ (with timestamp 9) arrives. Tuples $e_7$ (with timestamp 7) and $e_8$ (with timestamp 8) are two late arrivals, and are kept in the buffer. At the arrival of $e_9$ (with timestamp 10), K is again updated as because max{$D(e_7)$, $D(e_8)$}=max{3, 2}=3, bigger than the current K=2. After updating K to 3, $e_7$ is emitted. Tuples $e_8$, $e_6$, and $e_9$ are emitted in increasing timestamp order at the arrival of $e_{10}$ (with timestamp 13).

It is noted that $e_3$ is not handled successfully by the buffer and is still an out-of-order tuple in the buffer output. For the sliding window aggregate operator that consumes the buffer output, at the arrival of $e_3$, the aggregate result of the window ending at timestamp 4 has already been produced. Namely, $e_3$ fails to contribute to the result of that window. The solution presented herein deals with an unsuccessfully handled late arrival like $e_3$ as follows: if the late arrival can still contribute to results of future windows, it is retained and presented to the aggregate operator; otherwise, it is discarded. For example, if the window size w of the query is 3 time units, then $e_3$ is retained because it can still contribute to the result of the window with scope [3; 5]. However, if w is 2 time units, then $e_3$ cannot contribute to results of any future windows and will be discarded. Despite those unsuccessfully handled late arrivals produced when K is increased, MP-K-slack in general aims to adjust the buffer size to a big-enough value to accommodate all late arrivals. Therefore, it can guarantee a high result accuracy. However, such a conservative way of buffer size configuration can also lead to a high result latency.

Figure 2:
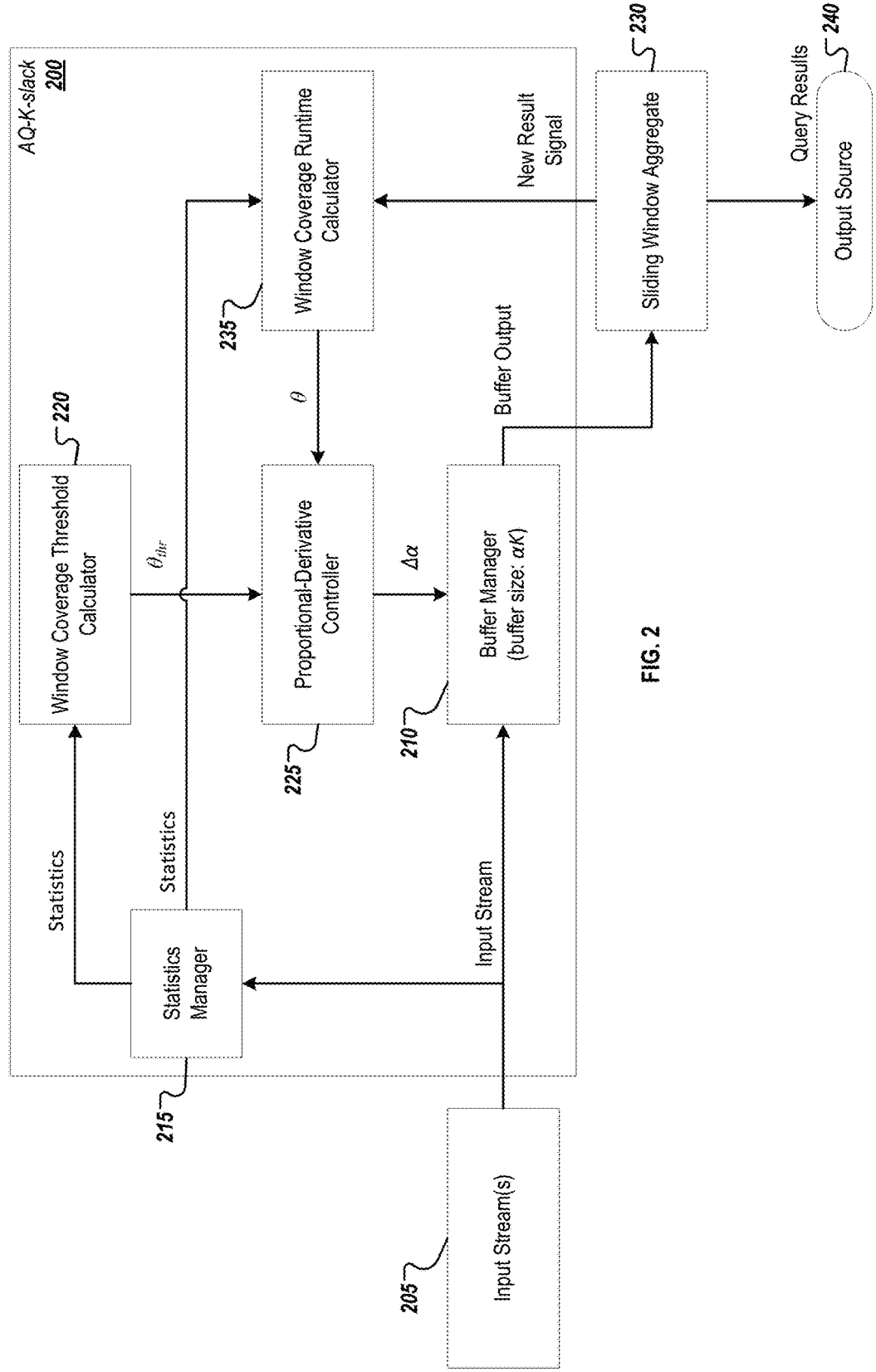
FIG. 2 illustrates an example design of an AQ-K-slack disorder handling system.

FIG. 2 illustrates an example design of an AQ-K-slack disorder handling system as described herein, including several components allowing the operations and advantages to be realized. It will be understood that the example components are for illustration purposes, and additional, alternative, or different combinations and components may be used in alternative implementations.

For each sliding window aggregate query annotated with a result relative error threshold, an instance of an AQ-K-slack buffer 200 according to the aggregate function, the window specification (w, β), and the error threshold ($\varepsilon_{thr}$, δ) is generated. For example purposes, the illustrated examples focus on queries with time-based sliding windows, although count-based sliding windows may also be used.

The AQ-K-slack 200 may be associated with one or more input streams 205, where the input streams 205 provide ongoing tuples from the one or more input sources. The buffer manager 210 maintains the buffer for sorting input tuples from the input stream 205. AQ-K-slack 200 dynamically adjusts the buffer size to minimize the result latency incurred by buffering, while honoring the user- or application-specified threshold for relative errors in produced query results. AQ-K-slack 200 achieves this goal by introducing a parameter α, where α is between 0 and 1, on top of the original parameter K. The parameter α is initialized to 1 and is dynamically adapted at query runtime by a Proportional-Derivative (PD) Controller 225. The adaptation of α is triggered by each query result produced after a predefined warm-up period, based on deviations between the quality of produced query results and the user- or application-specified quality expectation. An intermediate metric, the window coverage θ, is used to measure the quality of query results. To adapt α based on window coverages, AQ-K-slack uses a window coverage threshold calculator 220 to translate a user- or application-specified result relative error threshold ($\varepsilon_{thr}$; δ) to a window coverage threshold $\theta_{thr}$, and a window coverage runtime calculator 235 to measure window coverages of produced query results. The calculation of the window coverage threshold and the runtime measurement of window coverages of produced query results require some statistics of the data stream, which are collected and managed by the statistics manager 215. Based on the parameter α, the effective buffer size of AQ-K-slack becomes αK. Therefore, the condition for releasing a tuple $e_i$ from the buffer changes to $e_i.ts+\alpha K \leq t_{curr}$. Buffer output is provided to an associated query operator to perform a corresponding query upon the sorted data. In FIG. 2, that output is fed to a sliding window aggregate query 230. In response to performing the query on the received tuples from the buffer, the sliding aggregate query 230 notifies the window coverage runtime calculator 235 to perform an updated analysis of the current parameter α and triggers a determination as to whether further changes are needed. Additionally, query results from the sliding window aggregate 230 are sent to a corresponding output source 240, which may be an application, graphical user interface (GUI), backend system, client, or other suitable source. For some queries and query types, the user-configurable quality metric can be used directly, and no intermediate quality metric needs to be introduced. In the described instance, a threshold for the window coverage is calculated because it is an intermediate quality metric which is different from the relative error metric. If the user prefers, he/she could directly use the window coverage as the final quality metric. The step of calculating a quality threshold is not always necessary. In some instances, the user-specified quality threshold can be used directly instead of calculating an intermediate quality metric. For instance, if the configurable quality metric is the window coverage, then it can be used directly without calculating another metric. In such cases, the user would specify the window coverage threshold, and no need is there to calculate an additional threshold additionally.

The example illustrated in FIG. 1B shows that a late arrival cannot be handled successfully by the buffer if its delay is larger than the buffer size when the late arrival is received. Each unsuccessfully handled late arrival may cause inaccurate results of some previous windows constructed at the sliding window aggregate operator. The goal of the present disclosure and solution is to meet the user- or application-specified threshold for relative errors of query results. However, adjusting the buffer size directly based on relative errors of query results is expensive, as computing the relative error of a result requires the corresponding exact result, which cannot be obtained before all late arrivals falling into the corresponding window of the result have been received. Moreover, the way to compute an exact result depends on the specified aggregate function. For instance, for the COUNT function, previously produced inaccurate results can be maintained and corrected incrementally, whereas for the QUANTILE function, the original input tuples of each window must be maintained. When processing out-of-order data streams, computing the query result of a window before receiving all late arrivals falling into the window scope resembles sampling-based approximate query processing. Namely, the query result is indeed computed over a sample of original input tuples. In sampling-based query processing, the sampling rate parameter p determines the proportion of tuples within each window to be included in the sample. Given a relative error threshold, the minimum sampling rate required to meet the threshold can be determined.

To do so, intermediate metric for measuring the quality of aggregate results is introduced, the window coverage $\theta$, where $\theta$ is between 0 and 1. The window coverage of a query result can be defined as the ratio between the number of tuples that contribute to the result and the total number of tuples that fall into the corresponding window of the result. Since the applied sampling rate determines directly the proportion of tuples within each window to be retained for processing, there is a direct semantics mapping between the sampling rate and the window coverage. The error model for query results produced after disorder handling can be built in a similar way as for query results produced after sampling, and then derive the minimum window coverage required to meet a user- or application-specified error threshold. In the current description, this minimum window coverage is referred to as the window coverage threshold $\theta_{thr}$. The window coverage metric is generic as it depends only on the window specification of a query. For queries with different aggregate functions, window coverages of query results can be measured in a similar way. With the introduction of the window coverage metric, AQ-K-slack can perform quality-driven buffer size adaptation based on deviations between measured window coverages of produced query results and the derived window coverage threshold, rather than relative errors of produced query results.

Unlike the measurement of window coverages, the calculation of the window coverage threshold is aggregate-function-specific. A SUM function is used as an example. Denote the set of tuples belonging to a window in the absence of tuple disorder as V, the number of tuples in V denoted as $|V|$, as N, the values of tuples to be summed up as $v_1, v_2, \ldots, v_N$, and the exact SUM result over V as $A=\Sigma_{i=1}^{N} v_i$. Now assume that tuple disorder presents in the current stream. The set of tuples that actually get included into the window after disorder handling by the time the window is closed is denoted as V', a subset of V. Without knowing which tuples in V are absent in V', an assumption can be made that the probability that a tuple in V gets included in V' is P. Hence, the expected value of $|V'|$ is N×P, and the expected value of the window coverage is $$\theta = \frac{|V'|}{|V|} = \frac{N \times P}{N} = P.$$

Based on the above value-equivalence between P and $\theta$, N random variables $X_1, X_2, \ldots, X_N$ can be defined, such that $X_i = v_i$ where i is between 1 and N with probability $\theta$ and $X_i = 0$ with probability $1-\theta$. The sum of these random variables is $\hat{A} = \Sigma_{i=1}^{N} X_i$, which is also the SUM result over V'. Assuming that the mean and the variance of values of tuples in V are $\mu = \Sigma_{i=1}^{N} v_i / N$ and $\sigma^2 = \Sigma_{i=1}^{N} (v_i - \mu)^2 / N$, respectively, the mean and variance of the random variable $\hat{A}$ can be calculated. To do so, the following example equations may be used:

$$E[\hat{A}] = \sum_{i=1}^{N} E[X_i] = \sum_{i=1}^{N} (v_i \times \theta + 0 \times (1-\theta)) = \theta A$$

$$\begin{aligned} \mathrm{Var}[\hat{A}] &= E[\hat{A}^2] - E[\hat{A}]^2 \\ &= E[\hat{A}^2] - (\theta A)^2 \\ &= \sum_{i=1}^{N} E[X_i]^2 + \sum_{1 \le i \ne j \le N} E[X_i]E[X_j] - (\theta A)^2 \\ &= \sum_{i=1}^{N} \theta v_i^2 + \sum_{1 \le i \ne j \le N} \theta^2 v_i v_j - (\theta A)^2 \\ &= \theta \sum_{i=1}^{N} v_i^2 + \theta^2 \left( \left( \sum_{i=1}^{N} v_i \right)^2 - \sum_{i=1}^{N} v_i^2 \right) - (\theta A)^2 \\ &= (\theta - \theta^2) \sum_{i=1}^{N} v_i^2 \\ &= (\theta - \theta^2) \frac{\sigma^2 + \mu^2}{N \mu^2} A^2 \end{aligned}$$

The above computation is based on the assumption that random variables $X_i$ are statistically independent. In sampling-based query processing, this assumption holds naturally because tuples are included into the sample in a random manner. In contrast, late arrivals in an out-of-order data stream often present correlations, because tuple delays are often not random but caused by a faulty or overloaded source, an unstable communication link, etc. Strong correlations between late arrivals in the real-world data streams have been observed. However, here the statistical independence can be relied on to compute the mean and variance of $\hat{A}$. The reasons are twofold: (1) whether a tuple is a late arrival does not depend on the value of the tuple, and (2) the SUM result over V does not depend on the order among $v_i$. Therefore, even if a sequence of tuples, in terms of the timestamp order, are delayed together and missing in V', the tuples in V could be conceptually reordered to randomize the positions of those missing tuples, and then define random variables $X_i$ for the reordered V. This reordering of V does not influence the sum result over V.

By the central limit theorem, it can be assumed that $\hat{A}$ is normally distributed with mean $\theta A$ and standard deviation $$\sigma_e = \sqrt{(\theta - \theta^2) \times \frac{\sigma^2 + \mu^2}{N\mu^2}} |A|.$$

Based on statistical properties of the normal distribution, the associated critical value $z_c(\delta)$ for a given confidence level $\delta (0<\delta<1)$ can be determined. The critical value $z_c(\delta)$ for a given $\delta$ means that the probability that $\hat{A}$ lies outside the range $\theta A \pm z_c(\delta)\sigma_e$ is at most $\delta$. Therefore, to guarantee that the relative error of $\hat{A}$ exceeds $\varepsilon_{thr}$ with probability at most $\delta$, the value of $\theta$ must satisfy the condition $$\frac{(1-\theta)|A| + z_c(\delta)\sigma_e}{|A|} = (1-\theta) + z_c(\delta)\sqrt{(\theta-\theta^2) \times \frac{\sigma^2 + \mu^2}{N\mu^2}} \leq \varepsilon_{thr},$$

where $z_c$ is the corresponding critical value for $\delta$. The minimum $\theta$ satisfying this equation is the window coverage threshold $\theta_{thr}$ for the given result error threshold $\varepsilon_{thr}$. The value of N can be calculated from the window size and the tuple arrival rate estimated by statistics manager 215. The values of $\mu$ and $\sigma$ are estimated by the statistics manager 215 as well.

Pseudo code for determining the window coverage threshold $\theta_{thr}$ is provided herein. As input, the system can identify a window size w and a user- or application-specified error threshold ($\varepsilon_{thr}$; $\delta$). The output of the calculation is the window coverage threshold $\theta_{thr}$. First, N is calculated based on w and the estimated tuple arrival rate determined by the statistics manager 215. Estimations for the mean $\mu$ and variance $\sigma^2$ of values of tuples in a window are obtained from the statistics manager 215. These estimations are based on tuples observed so far during the process. The window coverage threshold $\sigma_{thr}$ is the minimum $\theta$ satisfying the equation $$\frac{(1-\theta)|A| + z_c(\delta)\sigma_e}{|A|} = (1-\theta) + z_c(\delta)\sqrt{(\theta-\theta^2) \times \frac{\sigma^2 + \mu^2}{N\mu^2}} \leq \varepsilon_{thr},$$

where $z_c$ is the corresponding critical value associated with the given confidence level $\delta$ according to the error function of a normal distribution.

At query runtime, $\sigma_{thr}$ is first calculated at the end of a predefined warm-up period. The warm-up period is used by the statistics manager 215 to collect enough statistics for the calculations. To adapt to changes in the tuple arrival rate and data characteristics, $\sigma_{thr}$ is re-calculated periodically during the lifetime of the query. More sophisticated policies for $\sigma_{thr}$ re-computation, e.g., based on changes in stream statistics and other determinations, may also be used.

The window coverage runtime calculator 235 of AQ-K-slack is responsible for measuring window coverages of produced query results at query runtime. Note that, if the total number $N_{rcv}$ of received tuples in a window, and the number $N_{late}$ of unsuccessfully handled late arrivals for this window are known, the window coverage for the result of the window can be measured as $$\theta = \frac{N_{rcv}}{N_{rcv} + N_{late}}.$$

Figure 3:
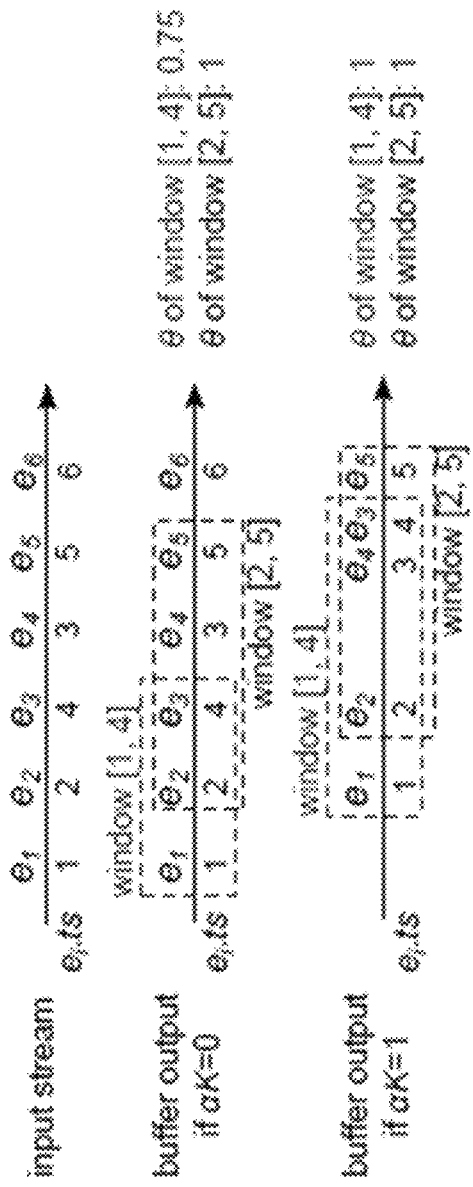
FIG. 3 is an example illustration of an amount of unsuccessfully handled late arrivals for a window during disorder handling as determined by the applied buffer size and the disorder characteristics within the window.

In sampling-based query processing, the amount of tuples excluded from a window, thus the resulting window coverage, is determined only by the applied sampling rate. In contrast, the amount of unsuccessfully handled late arrivals for a window during disorder handling is determined by both the applied buffer size, which is $\alpha K$ in AQ-K-slack 200, and the disorder characteristics within the window. FIG. 3 provides an example of this issue. Assume that an aggregate query with w=4 time units is executed over the input stream. For the window [1, 4], the window converge is 0.75 if $\alpha K$=0 (i.e., 3 of 4 of the tuples are captured in the window), and 1 if $\alpha K$=1 (i.e., all tuples are captured in the window). Whereas for the window [2, 5], the window coverage is 1 for both $\alpha K$ settings.

Query results are produced as soon as their corresponding windows are closed at the sliding window aggregate operator. Denoting the most recently closed window as $W_r$, the relationship between $W_r$ and the input buffer at the time $W_r$ is closed can be depicted with (a) of FIG. 4, where $t_{low}$ and $t_{up}$ denote the lower and upper endpoints of $W_r$, respectively.

Intuitively, it is expected to adjust the buffer size based on the window coverage of the most recent result, namely the result of $W_r$. However, at the time when $W_r$ is closed, any previously received late arrival either does not fall into the scope of $W_r$, or falls into the scope of $W_r$, and has been correctly sorted by the buffer to contribute to the result of $W_r$. Namely, at the time when $W_r$ is closed, all previously received late arrivals belonging to $W_r$ are successfully handled. Hence, the window coverage of $W_r$ at this moment is estimated to be 1. Although there might still be late arrivals in the input stream falling into $W_r$, they can be detected only at later points in time. Only then is it known whether the exact window coverage for this window is not 1.

Figure 4:
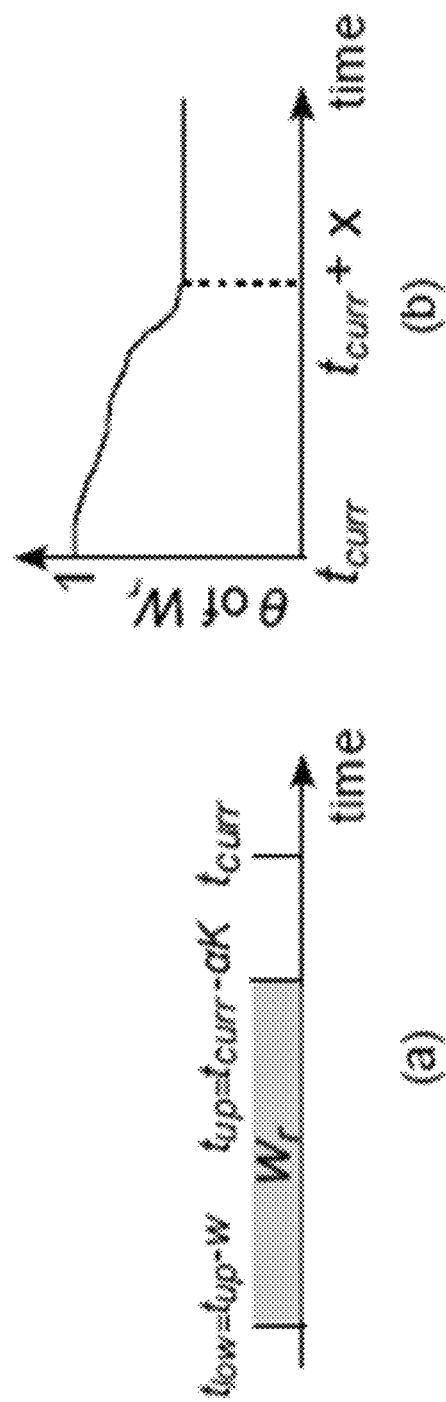
FIG. 4 is a depiction of the relationship between a window ($W_r$) and its input buffer at the time $W_r$ is closed, and a corresponding illustration of runtime behavior of measured window coverage of a window $W_r$.

The runtime behavior of the measured window coverage of a window is schematically depicted in (b) of FIG. 4. Starting from the point in time when a window is closed, the measured window coverage gradually decreases (from 1) as more and more late arrivals belonging to the window are observed, and reaches a stable value when all late arrivals belonging to the window are received. In many cases, the measured window coverage for the most recent window, and thus the most query result, is always 1 at the time the window is closed.

The illustration in (b) of FIG. 4 suggests that the measured window coverage of a result gets more and more accurate over time. In other words, window coverages of old query results are more accurate than those of recent results. Adjusting the buffer size based on inaccurate window coverages may lead to incorrect adjustment decisions. To avoid such wrong decisions, the window coverage of an old result is used to drive the buffer size adaptation. A decision is made as to which result to choose. In theory, without knowing the upper bound of delays of late arrivals within the input stream, a certain time or result to use cannot be certain as to when the window coverage of a result is stable. Therefore, this upper bound is estimated as the maximum delay among previously received late arrivals, which is captured by the parameter K in AQ-K-slack. Thus, denoting the upper endpoints of the corresponding window of a result as $t_{up}$, it can be assumed that the window coverage of the result becomes stable when $t_{up} < t_{curr} - K$. Window coverages of results produced before $t_{curr} - K$ are assumed to be stable.

Adapting the buffer size based on the window coverage of an old query result instead of the most recent one may result in a delayed adaptation. On the one hand, the adaptation is to be driven with accurate window coverages; on the other hand, the adaptation delay can be minimized by using window coverages of recent results. Note that the parameter K in AQ-K-slack captures the worst case tuple delay, which may occur rarely. To reduce the effect of uncommon delay spikes on the responsiveness of the adaptation, and to take skews in the distribution of late arrivals within the input stream into account, the window coverage chosen to be used can be the window coverage of the result that is produced L time units earlier than $t_{curr}$, where L equals the q-quantile (0<q<1) of delays of previously received late arrivals. Essentially, the parameter q determines how far to look back in the history of query results, and is therefore called a retrospect parameter. The bigger the value of q, the more accurate the measured window coverages.

Note that if L<αK, then the result chosen with the above described method is a future result. In this case, the measured window coverage of the most recent result, which is 1, is used to drive the buffer size adaptation.

In order to calculate the window coverage of a chosen result, statistics manager 215 uses a data structure M to maintain late-tuple counters $N_{late}$ as well as received-tuple counters $N_{rcv}$ for closed windows (i.e., produced results). For each late arrival e that is not handled successfully by the input buffer, previous windows that e belongs to are identified based on e.ts and the window specification (w, β). The $N_{late}$ counters of those windows are then increased. For each in-order tuple and each successfully handled late arrival, windows that the tuple belongs to are identified in the same way, and their $N_{rcv}$ counters are increased. In some instances, M is periodically purged to remove entries of very old windows, e.g., windows that are closed before $t_{curr}$−K, to minimize the space consumption of M.

The pseudo code for the window coverage calculation at runtime (performed, for example, by the window coverage runtime calculator 235 of FIG. 2) is provided herein. The input of the calculation is the $t_{curr}$ at the time a new query result is produced, as well as a retrospect parameter q (0<q<1). The output of the calculation is θ, the window coverage of a chosen produced result. First, L is determined based on a q-quantile of late arrival delays. Based on $t_{curr}$, and L, a previously produced result $R_{old}$ and its window $W_{old}$ are selected. From the entry for $W_{old}$ in M in statistics manager 215, the number of missing tuples $N_{late}$ and the number of received tuples $N_{rcv}$ in $W_{old}$ observed until $t_{curr}$ are obtained. The runtime window coverage calculation is then determined as $$\theta = \frac{N_{rcv}}{N_{rcv} + N_{late}}.$$

Turning to the adaptation of the buffer size in AQ-K-slack 200, the actual adaptation is based on an adaptation of parameter α, which is triggered by each new query result produced after the warm-up period. A feedback control-based a adaptation solution is provided to incorporate the changes on an ongoing basis to maintain the quality-based buffer size adaptation as the process continues. Buffer manager 210 of FIG. 2, along with the proportional-derivative controller 225, obtain the information from the system and generate the updated parameter α and, subsequently, the updated buffer size αK.

Taking the window coverage threshold $\theta_{thr}$ from window coverage threshold calculator 220 and window coverages θ of produced results from window coverage runtime calculator 235, AQ-K-slack 200 applies a proportional-derivative (PD) controller 225 to perform the runtime adaptation.

Figure 5:
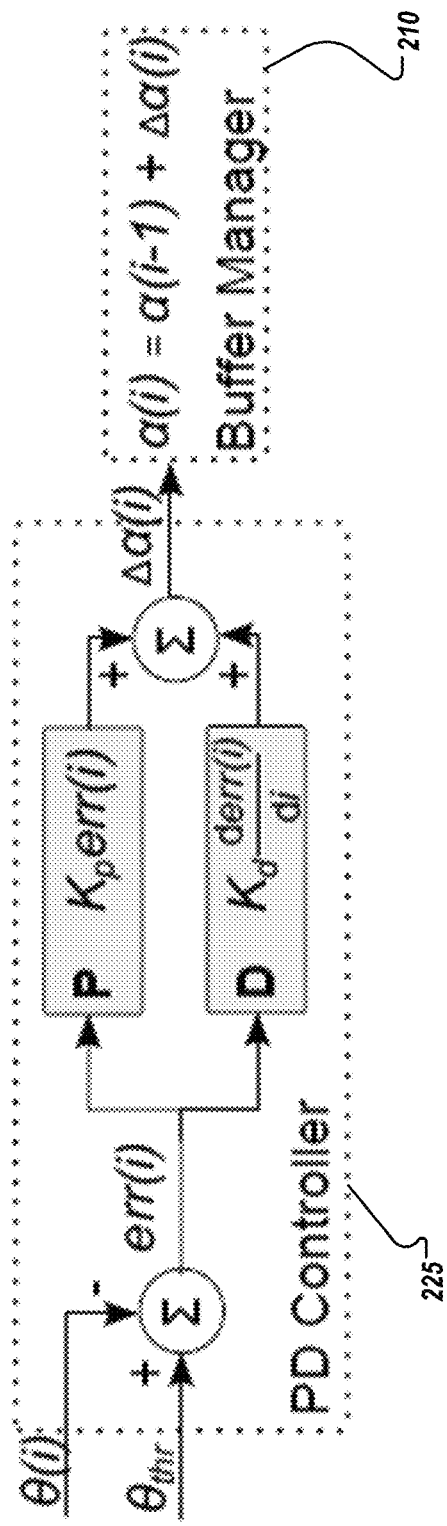
FIG. 5 illustrates an example adaptation solution in a portion of an example AQ-K-slack buffer system.

FIG. 5 illustrates an example adaptation solution using an enhanced view of the PD controller 225 and the buffer manager 210. The output of the controller 225 is the adjustment, i.e., the increase or the decrease, α, denoted by Δα. For the i-th measured window coverage θ(i) sent to the controller 225, the controller 225 determines Δα(i) based on the control error err(i), which is defined as the deviation between the measured window coverage θ(i) and the calculated window coverage threshold $\theta_{thr}$, i.e., err(i)=$\theta_{thr}$−θ(i). The value of Δα(i) is determined by two components of the control error: a proportional component (P), which corresponds to the present error, and a derivative component (D), which corresponds to a prediction of future errors. The value of Δα(i) is a weighted sum of the two components, where the weights are configured via parameters $K_p$ and $K_d$. The equation for determining Δα(i) is $$\Delta\alpha(i) = K_p err(i) + K_d \frac{derr(i)}{di}.$$

In one example, manual parameter tuning may be used in combination with other methods, such as a Ziegler-Nichols method for proportional-integral-derivative (PID) controllers, to configure parameters $K_p$ and $K_d$, so that they can minimize the resulting buffer size while respecting the user- or application-specified result accuracy requirement. In the illustrated example, and in contrast to a typical PID controller, the PD controller 225 does not have the integral component of the control error. The PD controller 225 is used in the example because the integral component can accumulate past errors, which can cause the so-called integral windup problem, if window coverages of produced results keep above the window coverage threshold for an extended period. This problem can occur during periods when the data stream is only slightly out of order. During these periods, the window coverages of produced results may stay well above the threshold, even though the buffer size is reduced to zero.

Figure 6:
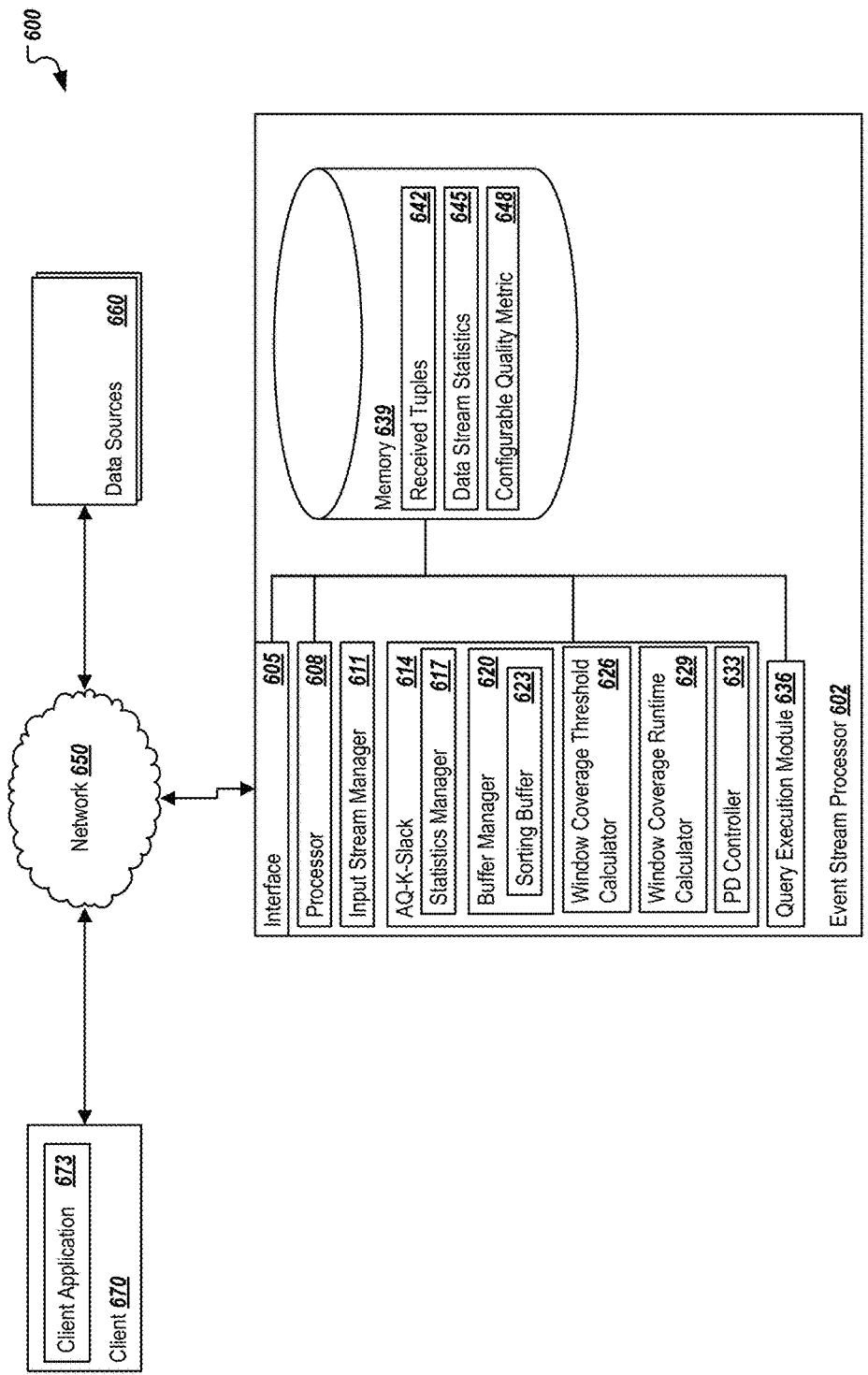
FIG. 6 is a block diagram illustrating an example system for providing quality-driven processing of out-of-order data streams based on a configurable quality metric.

FIG. 6 is a block diagram illustrating an example system 600 for providing quality-driven processing of out-of-order data streams based on a configurable quality metric. As illustrated in FIG. 6, system 600 is a client-server system capable of receiving a data stream of incoming tuples from one or more data sources 660 at an event stream processor system 602, and using a quality-driven processing on out-of-order data streams. The system 600 represents an example system including an AQ-K-slack component 614, which may be similar to the AQ-K-slack component 200 illustrated in FIG. 2. The configurable quality metric 648 may be user- or application-defined, and identifies the quality-based requirements of the AQ-K-slack for processing the data streams.

As illustrated, system 600 as illustrated includes or is communicably coupled with a client 670, one or more data sources 660, event stream processor 602, where those systems are connected by network 650. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate. For example, a single system alone may be sufficient to perform the operations of the system 600 where the data sources 660 are available from a single location at the system. In other instances, one or more of the data sources 660 may be logically separate from the event stream processor 602, where input streams from the data sources 660 may be received by the event stream processor 602 and processed using the AQ-K-slack 614 and corresponding query execution module 636.

As used in the present disclosure, the term "computer" is intended to encompass any suitable processing device. For example, event stream processor 602 may be any computer or processing device such as, for example, a blade server, general-purpose personal computer (PC), Mac®, workstation, UNIX-based workstation, or any other suitable device. Moreover, although FIG. 6 illustrates event stream processor 602 as a single system, the event stream processor 602 can be implemented using two or more systems, as well as computers other than servers, including a server pool. In other words, the present disclosure contemplates computers other than general-purpose computers, as well as computers without conventional operating systems. Further, illustrated event stream processor 602 and client 670 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, event stream processor 602 may be any suitable computing server or system for receiving and processing data streams from one or more data sources. The event stream processor 602 can perform event stream processing operations, such as those designed to assist in event visualization, event databases, event-driven middleware, and event processing languages, among others. The event stream processor 602 can perform tasks associated with processing streams of event data, such as with the goal of identifying meaningful patterns within those streams, employing techniques such as detection of relationships between multiple events, event correlation, event hierarchies, and other aspects such as causality, membership and timing. In the present illustration, the event stream processor 602 performs operations associated with receiving tuples from a data stream, handling any disorder processing of the received tuples, and providing a sorted set of tuples to a query execution module 636 performing operations related to a continuous query.

As illustrated, event stream processor 602 includes an interface 605, a processor 608, input stream manager 611, AQ-K-Slack 614, query execution module 636, and memory 639. In general, the event stream processor 602 is a simplified representation of one or more systems and/or servers that provide the described functionality, and is not meant to be limiting, but rather an example of the systems possible.

The interface 605 is used by the event stream processor 602 for communicating with other systems in a distributed environment—including within the environment 600—connected to the network 650, e.g., client(s) 670 and other systems communicably coupled to the network 650. Generally, the interface 605 comprises logic encoded in software and/or hardware in a suitable combination and operable to communicate with the network 650. More specifically, the interface 605 may comprise software supporting one or more communication protocols associated with communications such that the network 650 or interface's hardware is operable to communicate physical signals within and outside of the illustrated environment 600.

Network 650 facilitates wireless or wireline communications between the components of the environment 600 (i.e., between the event stream processor 602 and data sources 660 or client(s) 670, between clients 670, and among others components), as well as with any other local or remote computer, such as additional clients, servers, or other devices communicably coupled to network 650, including those not illustrated in FIG. 6. In the illustrated environment, the network 650 is depicted as a single network, but may be comprised of more than one network without departing from the scope of this disclosure, so long as at least a portion of the network 650 may facilitate communications between senders and recipients. In some instances, one or more of the illustrated components may be included within network 650 as one or more cloud-based services or operations. The network 650 may be all or a portion of an enterprise or secured network, while in another instance, at least a portion of the network 650 may represent a connection to the Internet. In some instances, a portion of the network 650 may be a virtual private network (VPN). Further, all or a portion of the network 650 can comprise either a wireline or wireless link. Example wireless links may include 802.11ac/ad/af/a/b/g/n, 802.20, WiMax, LTE, and/or any other appropriate wireless link. In other words, the network 650 encompasses any internal or external network, networks, subnetwork, or combination thereof operable to facilitate communications between various computing components inside and outside the illustrated environment 600. The network 650 may communicate, for example, Internet Protocol (IP) packets, Frame Relay frames, Asynchronous Transfer Mode (ATM) cells, voice, video, data, and other suitable information between network addresses. The network 134 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 6, the event stream processor 602 includes a processor 608. Although illustrated as a single processor 608 in FIG. 6, two or more processors may be used according to particular needs, desires, or particular implementations of the environment 600. Each processor 608 may be a central processing unit (CPU), an application-specific integrated circuit (ASIC), a field-programmable gate array (FPGA), or another suitable component. Generally, the processor 608 executes instructions and manipulates data to perform the operations of the event stream processor 602. Specifically, the processor 608 executes the algorithms and operations described in the illustrated figures, including the operations performing the functionality associated with the event stream processor 602 generally, as well as the various software modules (e.g., input stream manager 611, AQ-K-Slack 614, and query execution module 636), including the functionality for sending communications to and receiving transmissions data sources 660 and client(s) 670.

The input stream manager 611 represents an application, set of applications, software, software modules, or combination of software and hardware used to perform operations related to identifying and processing one or more input streams associated with a particular query and/or operation. Each event stream processor 602 may be associated with a plurality of queries and incoming data streams. The input stream manager 611 can perform operations to manage different incoming data streams from the plurality of data sources 660 and match those data streams to various queries and operations. For example, of 100 data sources 660 associated with the event stream processor 602, 50 may be associated with a first query, 25 with a second query, and 25 with a third query. The input stream manager 611 can perform operations to associate the appropriate input data streams with the associated query. To do so, the incoming tuples associated with those data streams may be fed or provided to different instances of AQ-K-Slack 614, each associated with a particular query or instance of a query.

The AQ-K-slack 614 represents an application, set of applications, software, software modules, or combination of software and hardware used to perform operations related to dynamically adjusting a buffer size associated with incoming, and out-of-order, data streams tuples of data in a quality-driven manner. The AQ-K-slack 614 and its components perform the operations of the components described in FIG. 2, and includes a statistics manager 617, buffer manager 620 (which includes a sorting buffer 623 for sorting incoming tuples into an correctly ordered fashion and storing them in said dynamically adjustable sorting buffer 623), window coverage threshold calculator 626, window coverage runtime calculator 629, and PD controller 633. In some instances, the adaptation itself can also be done by other types of controllers or methods, e.g., fuzzy neural network controller, or the congestion control method known from the transmission control protocol (TCP). A PD controller 633 is only one way to perform the adaptation. Additional modules and functionality may be included in alternative implementations. The AQ-K-slack 614 can be executed by processor 608 to perform the processes described herein. Multiple instances of AQ-K-slack 614 may execute or be present on a particular event stream processor 602, where each AQ-K-slack 614 is associated with a particular query or instance of a particular query.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The query execution module 636 receives the output of the AQ-K-slack 614 as input to a corresponding query, and performs and executes that query associated with the incoming data stream and the tuples output from AQ-K-slack 614. The query execution module 636 can be used to execute sliding window aggregate queries, as well as other suitable queries. The result quality metric "relative error" is specific for aggregate queries. However, the query itself could involve select and project operations, among others. For join queries a different quality metric is needed, since for join queries, unsuccessful disorder handling does not really lead to incorrect results, but rather incomplete results. Namely, a fraction of true join results will get lost. However, the overall idea of quality-driven disorder handling remains the same. The query execution module 636 may be any software module or component capable of receiving the input tuples and performing the associated query.

As illustrated, event stream processor 602 includes memory 639, or multiple memories 639. The memory 639 may include any memory or database module and may take the form of volatile or non-volatile memory including, without limitation, magnetic media, optical media, random access memory (RAM), read-only memory (ROM), removable media, or any other suitable local or remote memory component. The memory 639 may store various objects or data, including financial and/or business data, user information, behavior and access rules, administrative settings, password information, caches, applications, backup data, repositories storing business and/or dynamic information, and any other appropriate information including any parameters, variables, algorithms, instructions, rules, constraints, or references thereto associated with the purposes of the input stream manager 611, the AQ-K-Slack 614, the query execution module 636, and/or event stream processor 602, generally. Additionally, the memory 639 may store any other appropriate data, such as VPN applications, firmware logs and policies, firewall policies, a security or access log, print or other reporting files, as well as others. For example, illustrated memory 639 includes a set of received tuples 642, data stream statistics 645, and a configurable quality metric 648.

The received tuples 642 may be stored, in some cases, in memory 639. For example, as multiple data streams arrive at the event stream processor 602, the received tuples 642 may temporarily be stored or maintained in memory 639 prior to be being processed via the input stream manager 611 and into the corresponding AQ-K-Slack 614. Data stream statistics 645 may be an ongoing managed set of statistics related to a one or more data streams or combinations of data streams. The statistics manager 617 of AQ-K-Slack 614 may manage the statistics, using the information to provide updated data to the window coverage threshold calculator 626 and the window coverage runtime calculator 629, among others. Particular information stored in the data stream statistics may include tuple arrival rate and data characteristics for a particular data stream, which as noted, may include incoming data and tuples from more than data source 660. The configurable quality metric 648 may be defined by a user or an application, and is used as the basis for which the dynamic adjustment of the AQ-K-Slack 614 buffer size is changed. The user or application, such as user, administrator, client application (e.g., client application 673), or any other user or application may define the configurable quality metric 648. As described in relation to FIG. 2, the configurable quality metric 648 is used as a threshold on the relative errors to be produced in query results provided by the system. As noted, the relative error metric described herein is specific to aggregate queries. In general, the user can specify a requirement on a suitable quality metric for the executed query. The used quality metric may depend on the query type. Returning to the illustrated instance, the configurable quality metric 648 is used to allow the AQ-K-Slack 614 to dynamically adjust the input buffer size at query runtime to minimize the result latency while still maintaining the quality required by the user and/or application. Each instance of the AQ-K-slack 614 may be associated with a different configurable quality metric 648 as provided by the user or application. Additionally, the configurable quality metric 648 can be modified before, during, or after a query is begun and data is received.

Client 670 may be any computing device operable to connect to or communicate with event stream processor 602, and, in some cases, one or more of the data sources 660, other clients 670 (not illustrated), and/or other components via network 650, as well as with the network 650 itself, using a wireline or wireless connection. Client 670 can include a desktop computer, a mobile device, a tablet, a server, or any other suitable computer device. In general, client 670 comprises an electronic computer device operable to receive, 600 of FIG. 6. In some instances, client 670 may be a consumer of particular queries, in that a user or application associated with client 670 may receive query results from the event stream processor 602. For example, client application 673 may be a web browser, a dedicated query-related application or web service, or any other suitable component capable of receiving query results from the event stream processor 602. In some instances, results from the event stream processor 602 may be provided directly to the client 670 or the client application 673, while in other instances the client application 673 may be a web browser or otherwise able to communicate with, retrieve, and present the corresponding query results. In some instances, the user of the client 670, or the client application 673 itself, may be able to provide a quality-based metric for which queries executed by the event stream processor 602 should meet. Using this metric, which can be stored as the configurable quality metric 648, buffers associated with the AQ-K-slack 614 can be dynamically adjusted to ensure the quality metric 648 is met while minimizing the corresponding result latency to do so.

The illustrated client 670 is intended to encompass any computing device such as a desktop computer, laptop/notebook computer, mobile device, smartphone, personal data assistant (PDA), tablet computing device, one or more processors within these devices, or any other suitable processing device. For example, the client 670 may comprise of a computer that includes an input device, such as a keypad, touch screen, or other device that can accept user information, and an output device that conveys information associated with the operation of the client application 673 or the client 670 itself, including digital data, visual information, or a GUI.

Data sources 660 include any suitable data sources feeding tuples and data into one or more continuous queries managed by the event stream processor 602 and/or other suitable components. For example, the data sources 660 may be associated with any input source against which data is queries, including using sliding window aggregate queries. The data sources 660 may be sensors in a sensor network, financial information, real-time results from current events or actions, or any other suitable sources of data relevant to the queries executed at the event stream processor 602. The incoming data may be raw data provided by various systems, or may be processed data based on raw data captured or received at the data sources 660. It is noted that the disorder discussed herein is with respect to timestamps associated with tuples. Therefore, disorder handling makes sense only for streams where stream tuples contain timestamps.

While portions of the elements illustrated in FIG. 6 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 7:
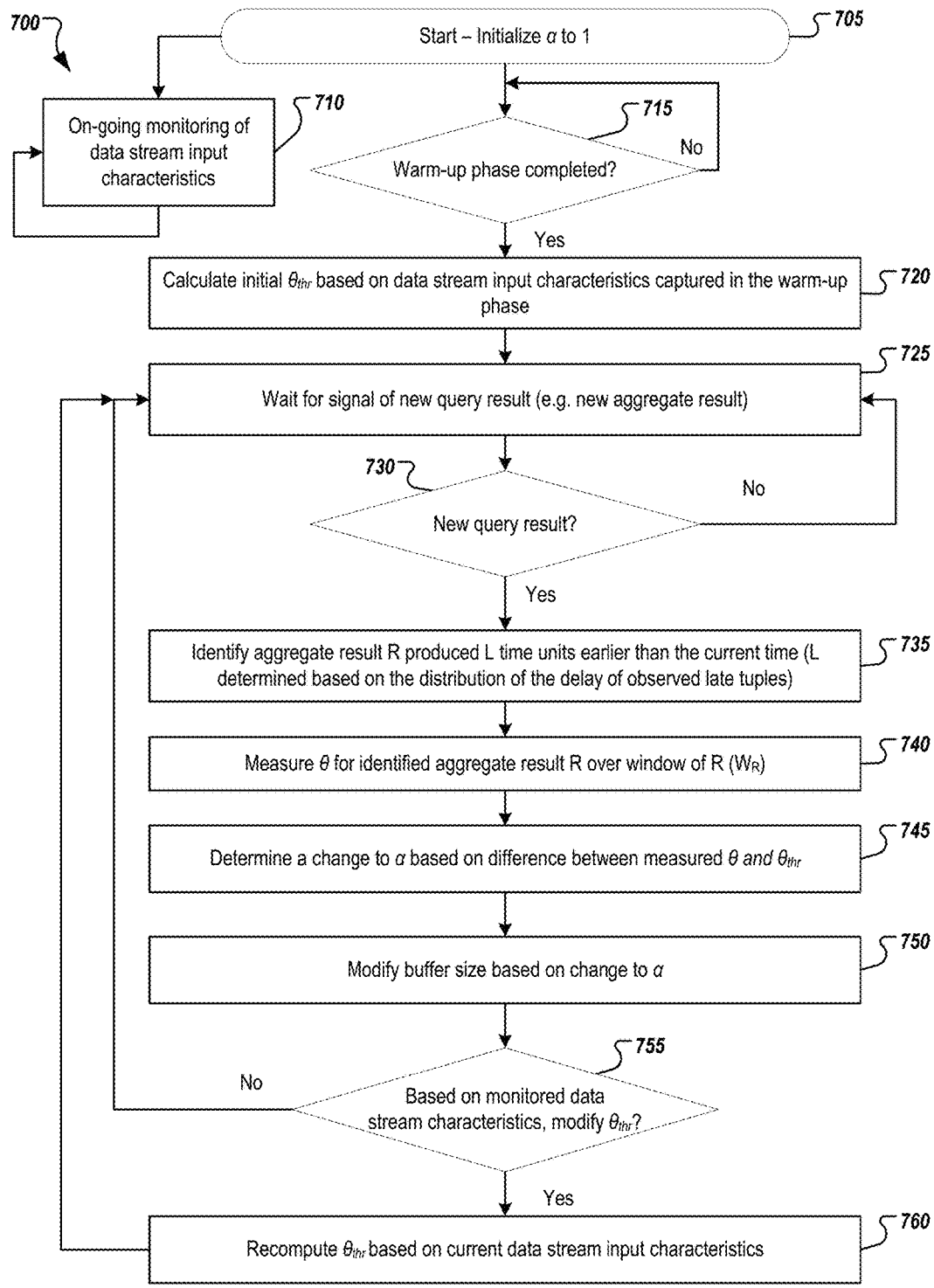
FIG. 7 is a flowchart of an example operation is a flowchart for providing quality-driven processing of out-of-order data streams based on a configurable quality metric.

FIG. 7 is an illustration of example operations 700 performed to generate and update a dynamic buffer in a system providing continuous queries. For clarity of presentation, the description that follows generally describes method 700 in the context of the systems 200 and 600 illustrated in FIGS. 2 and 6, respectively. However, it will be understood that method 700 may be performed, for example, by any other suitable system, environment, software, and hardware, or a combination of systems, environments, software, and hardware as appropriate. In the described method 700, the operations may be performed at an event stream processor or other suitable location.

At 705, the process is initiated. As described in relation to FIGS. 2 and 6, a parameter $\alpha$ (where $0 \leq \alpha \leq 1$) is used to modify the size of a buffer associated with the described AQ-K-Slack solution, where the size of the buffer is dynamically modified to satisfy a user-defined quality metric, while minimizing the size to reduce the latency results associated with the buffer and delivery of query results. To begin the process, the parameter $\alpha$ is initialized to 1 such that the buffer is its standard size. A warm-up phase or period is also begun at 705, where the warm-up phase allows the system to collect information on the data streams and perform an on-going monitoring of data stream input characteristics, including a rate at which tuples are received. The monitoring is illustrated at 710, and is performed on a continuing basis in parallel to the other operations of FIG. 7. This monitored information is used to calculate and, eventually, update the value of parameter $\alpha$ as needed based on updated information. At 715, a determination is made as to whether the warm-up phase is completed. If not, method 700 waits until the warm-up phase is complete to continue. If so, method 700 continues to 720.

At 720, an initial window coverage threshold $\theta_{thr}$ is calculated based on the data stream input characteristics captured in the warm-up phase. The window coverage threshold $\theta_{thr}$ represents a minimum window coverage value required to meet a user- or application-specified error threshold associated with the current query. The window coverage threshold $\theta_{thr}$ is aggregate-function specific, in that the minimum coverage is associated with the particular query being executed. The window coverage threshold $\theta_{thr}$ can be updated periodically throughout the lifetime operations of a particular query. In some instances, $\theta_{thr}$ can be updated every w time units, where w is equal to the window size. Alternatively, the update can be triggered when a significant change in the input characteristics is detected by the statistics manager.

At 725, method 700 waits for a signal that a new query result associated with the query is produced after the warm-up period has completed. Once a new query result is available, method 700 can determine whether updates to parameter $\alpha$ are needed. During the warm-up period, no changes are made to parameter $\alpha$ as the system learns and captures information about the query and the current input characteristics. In some instances, the query may have produced more than one result during the warm-up period even though adaptations are not being made. After the warm-up period has completed, every new query result can and/or will trigger the adaptation actions associated with parameter $\alpha$, although the determined new parameter $\alpha$ may be the same as the prior parameter $\alpha$. Once the warm-up period is over and adaptations have begun, parameter $\alpha$ can be updated to reflect the updated data stream input characteristics after query results are received while maintaining the user-defined quality metric. At 730 the determination is made as to the new query result is generated, and if so, method 700 continues to 735.

At 735, an aggregate result R is identified that is produced L time units earlier than the current time. L is determined based on the distribution of delay of observed late tuples. As the solution relies on obtaining accurate data sets over certain windows, method 700 attempts to identify complete results R where the data sets are complete and no further late tuples are received. To do so, as described in prior figures, L is selected such that all tuples in the aggregate result from L time units earlier than the current time are highly like to have been received and that no further tuples are to be received. While using prior aggregate results may delay adaptation, it can ensure that accurate window coverages are used in driving the adaptation. Prior solutions used a buffer of size K, where K represented the worst case tuple delay. In using the adaptation based on the calculated parameter α, the size of the buffer can be significantly reduced. By using a prior aggregate result R, recent skews in the distribution of late arrivals within the input stream can be avoided.

At 740, a window coverage at runtime θ for the identified aggregate result R over a window or R (denoted $W_R$) is calculated. The window coverage at runtime θ is calculated, as previously mentioned, as a number of so-far observed in-order tuples belonging to $W_R$, divided by the sum of a number of so-far observed in-order tuples belong to $W_R$ plus a number of so-far observed late tuples that also belong to $W_R$. This calculation provides an actual quality metric of the windows, where the number of actual tuples received in a window can be compared to the total number of tuples (received plus late) that should have been received during the window.

At 745, a change to the parameter α is determined based on a difference between the measured window coverage at runtime θ and the current window coverage threshold $\theta_{thr}$. Prior to the first iteration of the adaptation, parameter α is initialized to 1. In the first and further iteration of the change to parameter α, the parameter's value may be stay the same or be adapted or changed to another value other than 1 (e.g., where $0 \leq \alpha \leq 1$) based on the information available. At 745, the delta of the current value of α can be determined as opposed to an absolute value of α. The value of the change or delta is based on the difference between the measured window coverage θ and the current window coverage threshold $\theta_{thr}$. In some instances, the delta calculation can be based on a control error between the two values. Further, in some instances, the calculation may be based on two components of the control error—that is, a proportional component P of the control error corresponding to the present error and a derivative component D of the control error corresponding to a prediction of future errors. The delta calculation in those instances may be a weighted sum of the two components, where the respective weights can be defined by the system or any other suitable method. In FIG. 2, for example, the calculation of the change is parameter α is performed by a proportional derivative controller.

At 750, the buffer size associated with the query is modified based on the change to α, where the calculated delta is added to the current parameter α. As the delta may be a negative value indicating a decrease in the size of parameter α, the addition may result in a decrease in the parameter α. The change in the size of parameter α is applied to the buffer with the initial size K, where the updated size of the buffer is represented by αK.

At 755, a determination is made as to whether, based on the monitored data stream characteristics, the window coverage threshold $\theta_{thr}$ should be modified. The changes in characteristics may include changes in the timing of received tuples or other identified characteristics. In some instances, the window coverage threshold $\theta_{thr}$ may be recalculated on a periodic basis regardless of the updated data characteristics. If no changes are to be made, method 700 returns to 725 to wait for a new query result signal. If changes are to be made, method 700 continues to 760, where window coverage threshold $\theta_{thr}$ is recalculated based on current data stream input characteristics. Method 700 then returns to 725.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method of processing data streams performed by one or more processors, the method comprising:

identifying, by the one or more processors, a configurable quality metric defined by a user or application for executing continuous queries associated with a data stream over a sliding window, the configurable quality metric specifying a user requirement for the quality of the continuous query result;

calculating, by the one or more processors, a quality threshold metric based on the identified configurable quality metric, the configurable quality metric associated with a size of an adaptation buffer for incoming tuples associated with the continuous query associated with the data stream;

in response to receiving a signal indicating a query result is generated, identifying, by the one or more processors, a sliding window prior to a current time;

measuring, by the one or more processors, a runtime quality metric associated with the incoming tuples for the identified sliding window; and dynamically modifying, by the one or more processors, the adaptation buffer at query runtime based on a difference between the quality threshold metric and the measured runtime quality metric.

2. The method of claim 1, wherein dynamically modifying the adaptation buffer comprises:

determining a change to a proportional parameter associated with an adaptation buffer based on the difference between the quality threshold metric and the measured runtime quality metric; and modifying the adaptation buffer by applying the determined change to the proportional parameter to the adaptation buffer.

3. The method of claim 2, further comprising continuously monitoring statistics related to the data stream associated with the incoming tuples for future adaptation of the proportional parameter associated with the adaptation buffer.

4. The method of claim 3, the monitored statistics including an estimated tuple arrival rate and data characteristics associated with the data stream.

5. The method of claim 3, further comprising repeating the measuring, determining, and modifying operations in response to each signal indicating a new query result is generated, wherein measuring the runtime quality metric associated with the incoming tuples for the identified sliding window is based on an updated set of monitored statistics obtained by the continuous monitoring.

6. The method of claim 3, further comprising repeating the measuring, determining, and modifying operations in response to receiving a set of predefined query results or in response to passage of a predefined number of time units.

7. The method of claim 3, wherein the proportional parameter is initially set to 1.

8. The method of claim 2, wherein the size of the adaptation buffer is associated with a size parameter representing a maximum delay among previously received late tuple arrivals within a window, and wherein determining the change to the adaptation buffer based on a difference between the quality threshold metric and the measured runtime quality metric includes modifying an adaptation parameter defining a proportional change to the size parameter of the adaptation buffer, and wherein modifying the adaptation buffer comprises modifying the adaptation buffer size based on the determined modified adaptation parameter.

9. The method of claim 1, wherein the configurable quality metric identifies a relative error, the relative error representing a specified threshold for relative errors in produced query results.

10. The method of claim 9, wherein the relative error is translated into a window coverage threshold, the window coverage threshold representing an intermediate quality metric derived from the relative error, the window coverage threshold defining a minimum window associated with the buffer to satisfy the configurable quality metric.

11. The method of claim 1, further comprising performing a warm-up period prior to calculating an initial quality threshold based on the identified configurable quality metric.

12. The method of claim 1, wherein calculating the quality threshold metric comprises using the identified configurable quality metric as the quality threshold metric.

13. A non-transitory, computer-readable medium storing computer-readable instructions executable by a computer, wherein the instructions instruct the computer to:
identify, by the computer, a configurable quality metric defined by a user or application for executing continuous queries associated with a data stream over a sliding window, the configurable quality metric specifying a user requirement for the quality of the continuous query result;
calculate, by the computer, a quality threshold metric based on the identified configurable quality metric, the configurable quality metric associated with a size of an adaptation buffer for incoming tuples associated with the continuous query associated with the data stream;
in response to receiving a signal indicating a query result is generated, identify, by the computer, a sliding window prior to a current time;
measure, by the computer, a runtime quality metric associated with the incoming tuples for the identified sliding window; and
dynamically modify, by the computer, the adaptation buffer at query runtime based on a difference between the quality threshold metric and the measured runtime quality metric.

14. The medium of claim 13, wherein modifying the adaptation buffer comprises:

determining a change to a proportional parameter associated with an adaptation buffer based on the difference between the quality threshold metric and the measured runtime quality metric; and
modifying the adaptation buffer by applying the determined change to the proportional parameter to the adaptation buffer.

15. The medium of claim 14, wherein the instructions instruct the computer to continuously monitoring statistics related to a data stream associated with the incoming tuples for future adaptation of the proportional parameter associated with the adaptation buffer.

16. The medium of claim 15, the monitored statistics including an estimated tuple arrival rate and data characteristics associated with the data stream.

17. The medium of claim 15, wherein the instructions instruct the computer to repeat the measuring, determining, and modifying operations in response to each signal indicating a new query result is generated, wherein measuring the runtime quality metric associated with the incoming tuples for the identified sliding window is based on an updated set of monitored statistics obtained by the continuous monitoring.

18. The medium of claim 13, wherein the configurable quality metric identifies a relative error, the relative error representing a specified threshold for relative errors in produced query results.

19. The medium of claim 18, wherein the relative error is translated into a window coverage threshold, the window coverage threshold represents an intermediate quality metric derived from the relative error, the window coverage threshold defining a minimum window associated with the buffer to satisfy the configurable quality metric.

20. A system, comprising:
a memory;
at least one hardware processor interoperably coupled with the memory and configured to:;
identify, by the at least one hardware processor, a configurable quality metric defined by a user or application for executing continuous queries associated with a data stream over a sliding window, the configurable quality metric specifying a user requirement for the quality of the continuous query result;
calculate, by the at least one hardware processor, a quality threshold metric based on the identified configurable quality metric, the configurable quality metric associated with a size of an adaptation buffer for incoming tuples associated with the continuous query associated with the data stream;
in response to receiving a signal indicating a query result is generated, identify, by the at least one hardware processor, a sliding window prior to a current time;
measure, by the at least one hardware processor, a runtime quality metric associated with the incoming tuples for the identified sliding window; and
dynamically modify, by the at least one hardware processor, the adaptation buffer at query runtime based on a difference between the quality threshold metric and the measured runtime quality metric.

* * * * *